UNITED STATES PATENT

Desani et al.

(10) Patent No.: US 8,325,211 B2
(45) Date of Patent: Dec. 4, 2012

(54) APPARATUS FOR ALIGNMENT OF VIDEO CLOCK WITH THE ROS START OF SCAN SENSOR SIGNAL IN PRINTING SYSTEMS (75) Inventors: Ramakanth Desani, Rochester, NY (US); James W. Stevens, Rochester, NY (US); Jess R. Gentner, Rochester, NY (US); Terri A. Clingerman, North Rose, NY (US)

(73) Assignee: Xerox Corporation, Norwalk, CT (US)

( * ) Notice: Subject to any disclaimer, the term of this patent is extended or adjusted under 35 U.S.C. 154(b) by 417 days.

(21) Appl. No.: 12/689,541

(22) Filed: Jan. 19, 2010

(65) Prior Publication Data
US 2011/0175975 A1 Jul. 21, 2011

(51) Int. Cl.
*B41J 2/47* (2006.01)
*B41J 2/435* (2006.01)

(52) U.S. Cl. .......................... 347/235; 347/250; 347/224

(58) Field of Classification Search .................. 347/224, 347/247, 235, 250
See application file for complete search history.

(56) References Cited

U.S. PATENT DOCUMENTS

| 5,485,195 A * | 1/1996 | Nacman | 347/247 |
| 5,671,069 A * | 9/1997 | Kodama | 358/474 |
| 5,710,589 A * | 1/1998 | Genovese | 347/262 |
| 2007/0001718 A1* | 1/2007 | Seethamraju | 327/115 |

* cited by examiner

*Primary Examiner* — Manish S Shah
*Assistant Examiner* — Sarah Al Hashimi
(74) *Attorney, Agent, or Firm* — Oliff & Berridge, PLC (57) ABSTRACT

Systems and methods are provided for aligning a video clock with the raster output scanner start-of-scan signal in printing systems. A system and method is proposed to align the pixel clock to an asynchronous reference signal generated in the raster output scanner. The proposed system and method adjusts a phase for a static phase value while performing a dynamic phase shifting for the start-of-scan signal alignment.

18 Claims, 5 Drawing Sheets

APPARATUS FOR ALIGNMENT OF VIDEO CLOCK WITH THE ROS START OF SCAN SENSOR SIGNAL IN PRINTING SYSTEMS

BACKGROUND

This disclosure relates to alignment of video clocks used in printing systems. More specifically, this disclosure relates to alignment of a video clock signal to synchronize the transfer of video data to a raster output scanner ("ROS").

Many laser printing systems take rasterized print data and output the print data to some type of medium (i.e. paper) using a laser light directed onto a photoreceptive drum that imprints a toner or ink onto the medium. The laser signal is typically activated upon a Start-of-Scan ("SOS") signal that indicates when the laser signal should begin the printing process for imprinting the rasterized print data onto a medium. The SOS signal essentially directs the laser to begin the printing process for the raster image data.

In past printing systems, the SOS signal operated independently from the video pixel clock signal, where the video pixel clock signal controlled the timing related to the laser scanning between paired photoreceptors on a photoreceptive drum. As such, the SOS signal is asynchronous because no clock signal is therefore associated with the SOS signal. The asynchronous SOS signal is therefore essentially blind to the timing of the synchronous video pixel clock signal because the video pixel clock signal is an independently operated clock, timed for printing. In previous systems, misalignment often occurred between the asynchronous SOS signal and the synchronous video pixel clock signal. This misalignment caused jitter to occur in the print output and artifacts to appear in the printed image.

SUMMARY

When designing a laser printing system, the image path electronics typically require a number of critical input/output ("I/O") signals to synchronize the transfer of video data to an ROS. One of these signals is supplied from the ROS to indicate the beginning of an ROS laser beam sweep. Specifically, the signal indicating the start of the ROS laser beam sweep is the SOS signal.

The SOS signal is generated by a beam sensor on the ROS module. The SOS indicates the start of each raster line to be traced onto the photo receptor. The SOS is asynchronous to a pixel clock that is normally used to synchronize clock video pixel data to the ROS laser(s). In other words, the pixel clock operates on a synchronous clock signal where the SOS does not have any clock signal operating the timing in which the SOS begins.

In standard printing systems, the use of an asynchronous SOS signal with a synchronous pixel clock could cause time interval errors in the pixel clock data alignment. These time interval errors can cause jitter and thereby cause artifacts to appear in the final output image.

In order to achieve the highest level of scan-to-scan pixel placement accuracy, there is a need to align the pixel clock with the SOS signal, so that all the rasters are aligned in the slow scan direction. In order to address the drawbacks to the above-described video clock alignment problems, a system and method for aligning a video clock with the ROS start-of-scan sensor signal are provided. The system and method provide a way to align the pixel clock to the asynchronous reference signal (i.e. SOS) generated in the ROS. The system and method phase adjust for a static phase value (ROS specific phase adjustment) while doing the dynamic phase shifting for the SOS alignment.

In accordance with various aspects of the disclosure, a method for aligning a clock signal in an image forming device comprises the steps of inputting a start-of-scan signal; inputting a plurality of candidate phase adjusted clock signals; separating the plurality of phase adjusted clock signals by a phase increment; determining a phase time in which the start-of-scan signal reaches a rising clock edge; selecting one of the plurality of phase adjusted clock signals as the output adjusted clock phase signal; and outputting an adjusted clock phase signal.

In other aspects of this disclosure, there is an apparatus for aligning a clock signal in an image forming device having a phase detection unit that receives as an input a start-of-scan signal and a plurality of candidate phase adjusted clock signals, and outputs an adjusted clock phase signal, wherein the plurality of phase adjusted clock signals are separated by a phase increment, wherein the phase detection unit determines a phase time in which the start-of-scan signal reaches a rising clock edge, and wherein the phase detection unit then selecting one of the plurality of phase adjusted clock signals as the output adjusted clock phase signal.

In other aspects of this disclosure, there is an image forming apparatus having a laser input signal for directing formation of an image onto a medium, the laser input signal having a clock phase signal, the clock phase signal having an initial phase; a rotatable motor having a plurality of mirrors on each face of the motor for reflecting the laser input signal; a start-of-scan detector for receiving the reflected laser light from one of the plurality of mirrors on the rotatable motor, the start-of-scan detector outputting a start-of-scan signal; a phase adjustment unit for adjusting the clock phase of the laser input signal, the phase adjustment unit having a phase detection unit that receives as an input the start-of-scan signal and a plurality of candidate phase adjusted clock signals, and outputs an adjusted clock phase signal; and a photoreceptive drum that receives the laser input signal and forms an image onto a medium, wherein the plurality of phase adjusted clock signals are separated by a phase increment, wherein the phase detection unit determines a phase time in which the start-of-scan signal reaches a rising clock edge, and wherein the phase detection unit then selects one of the plurality of phase adjusted clock signals as the output adjusted clock phase signal.

These and other features and advantages of this disclosure are described in, or apparent from, the following detailed description of various exemplary embodiments of the systems and methods according to this disclosure.

BRIEF DESCRIPTION OF THE DRAWINGS

Various exemplary details of systems and methods are described, with reference to the following figures, wherein.

DETAILED DESCRIPTION OF THE EMBODIMENTS

Figure 1:
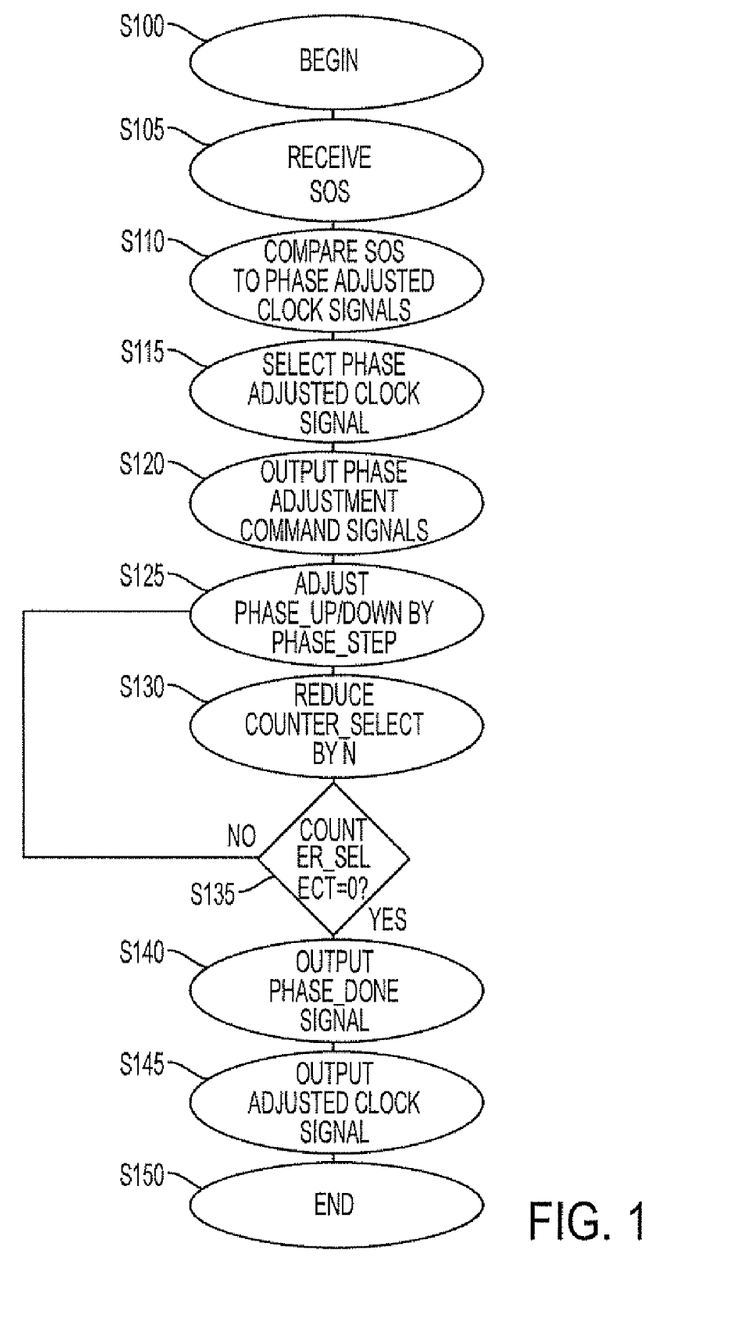
FIG. 1 illustrates an exemplary flow chart for determining the adjusted phase for the pixel clock signal.

FIG. 1 illustrates an exemplary flow chart for a method to determine the adjusted phase for the pixel clock signal. As shown in FIG. 1, the process of the method starts at step S100 and proceeds to step S105 where an SOS signal is input. As explained in the discussion of FIG. 2 below, the SOS signal is input from the SOS detector based upon a reflection of the laser light off the MPA Motor 235. Once the SOS signal is input, the system moves to step S110 where the rising edge of the SOS signal is compared to a plurality of phase adjusted clock signals. In an exemplary embodiment, the system has eight phase adjusted clock signals spaced out at intervals of 45 degrees.

Figure 4:
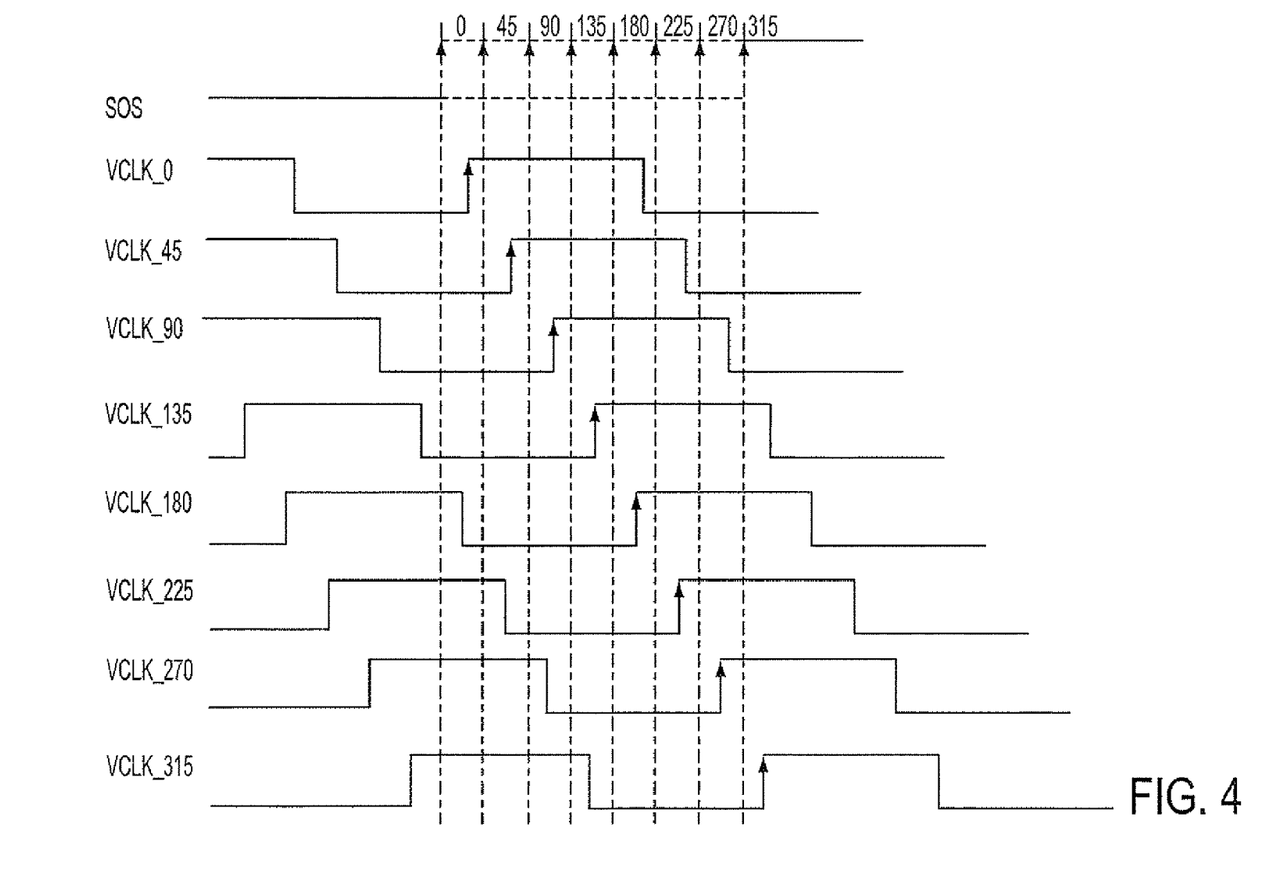
FIG. 4 illustrates an example of a phase detection timing diagram for detecting the phase of the pixel clock signal.

Once the SOS signal reaches a rising edge, the phase adjusted clock signal is selected that corresponds to the time in which the SOS signal reached a rising edge. For example, and as can be seen in FIG. 4, if the SOS signal rising edge occurs between 180 and 225 degrees, phase adjusted clock signal VCLK_225 is selected. After the SOS signal has reached a rising edge, and the system determines the phase range in which the rising edge occurs, the system moves to step S115 where the phase adjusted clock signal is selected.

After selecting the phase adjusted clock signal, the system moves to step S120 where a state machine outputs a phase_up/down signal, a phase_step signal, and a counter_select signal. As explained in the detailed description of FIG. 3, although not limited to this embodiment, the phase_up/down signal indicates the direction in which to shift the phase. For example, a phase_up/down signal shifting the phase up numerically increases the value of the phase, where a phase_up/down signal shifting the phase down numerically decreases the value of the phase. The phase_step signal represents the increment in which the phase should be adjusted up or down. In an exemplary embodiment the phase_step signal should be set to 45 degrees. Finally, the counter_select signal represents the amount of times the phase should be adjusted in the up or down direction. For example, if the phase is currently set at 180 degrees, and the phase should be adjusted to 315 degrees at 45 degree increments, the phase_up/down signal would be set to "UP," the phase_step would be set to 45 degrees, and the counter_select signal would be set to 3, indicating that 3 phase_steps would be necessary to increase from 180 to 225 to 270 to 315 degrees.

Once the phase_up/down, phase_step, and counter_select signals are output from the state machine, the system moves to step S125 where the phase is adjusted either up or down based on the phase_up/down signal in a single increment designated by the phase_step signal. After the phase has been adjusted in either the up or down direction, the system moves to step S130 where the counter_select signal is reduced by a factor of n. In an exemplary embodiment, the value n equals 1.

Once the counter_select signal is decreased by the factor of n, the system moves to step S135 where it determines if counter_select equals 0. If counter_select does not equal 0, the system goes back to step S125 and repeats steps S125 and S130 until counter_select equals 0. If counter_select equals 0, the system moves to step S140 where the state machine receives an input signal phase_done indicating that the phase adjustment process is complete. Once the clock signal phase adjustment is complete, the system moves to step S145 where the modified phase adjusted clock signal is output. As explained in FIG. 3, the clock_135_dynamic 345 is the phase adjusted clock signal the adjusts the phase for the video pixel clock signal to properly align the video pixel clock signal with the SOS signal for succeeding scan lines.

Figure 2:
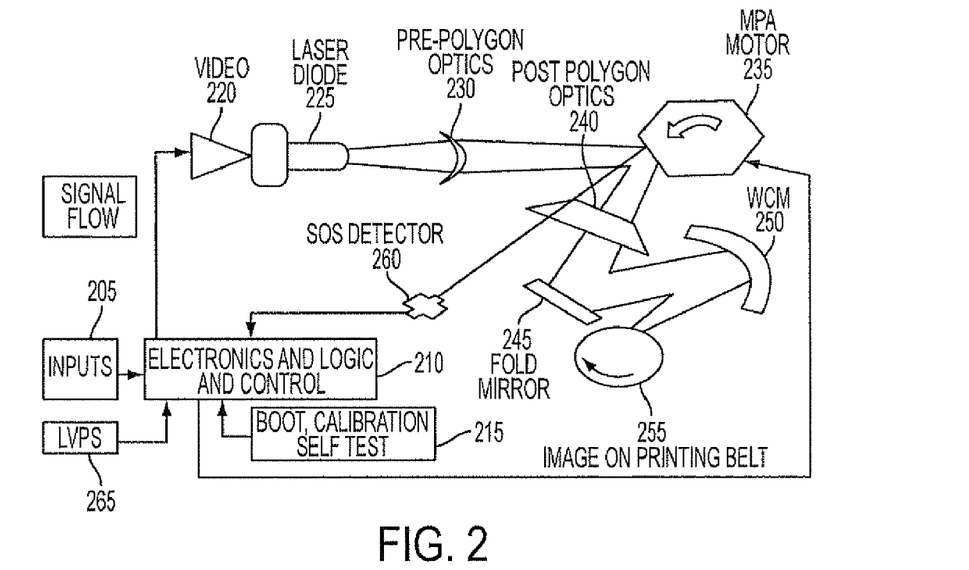
FIG. 2 illustrates an exemplary architecture for SOS signal generation.

FIG. 2 is an exemplary architecture of SOS signal generation in a standard laser printing system. As can be seen in FIG. 2, raster data input 205 inputs the raster image data to the electronics and logic and control unit 210. The electronic and logic and control unit 210 performs multiple tasks related to the overall operation of the printing system. More specifically, the electronics and logic and control unit 265 adjusts the phase to synchronize the SOS signal with the video pixel clock signal. LVPS 210 is a low-voltage power supply that powers the printing system. Boot, Calibration, Self Test 215 is an initial self-diagnostic/boot sequence for the printing system when beginning overall operation.

The video unit 220 provides the raster image data to the laser diode 225 so the laser diode 225 can guide the Printing Belt 255 to imprint an ink or toner onto a medium. The laser diode 225 projects a laser beam that follows an optical path to the Printing Belt 255. The laser beam first approaches a pre-polygon optics 230 that directs the light to the MPA Motor 235. Although not limited to this embodiment, the MPA Motor 235 can have six sides in which a mirror is placed on the face of each side of the motor. The MPA Motor 235 reflects the laser beam light such that an SOS detector unit 260 can identify when the laser beam has reached the MPA Motor 235. The SOS detector sends a signal to the electronics and logic and control 210 indicating that a start-of-scan signal has been initiated.

After the laser beam contacts the MPA Motor 235, the laser beam travels through the post polygon optics 240 where it then reflects off a fold mirror 245. After reflecting off of the fold mirror 245 the laser beam travels to the WCM 250 where it then is directed to the Printing Belt 255 where the Printing Belt 255 ultimately outputs the data onto a medium. It should be appreciated that it is well known in the art for a laser printing system to direct the printing process of the output data onto a print medium using some type of printing belt or drum. This process is commonly referred to as electrophotographic marking which is a well known method of copying or printing documents by exposing a substantially uniformly charged photoreceptor to an optical light image of an original document, discharging the photoreceptor to create an electrostatic latent image of the original document on the photoreceptor's surface, selectively adhering toner to the latent image, and transferring the resulting toner pattern from the photoreceptor, either directly to a marking substrate such as a sheet of paper, or indirectly after an intermediate transfer step. The transferred toner powder image is fused to the marking substrate using heat and/or pressure to make the image permanent. Finally, the surface of the photoreceptor is cleaned of residual developing material and recharged in preparation for the creation of the next image.

Figure 3:
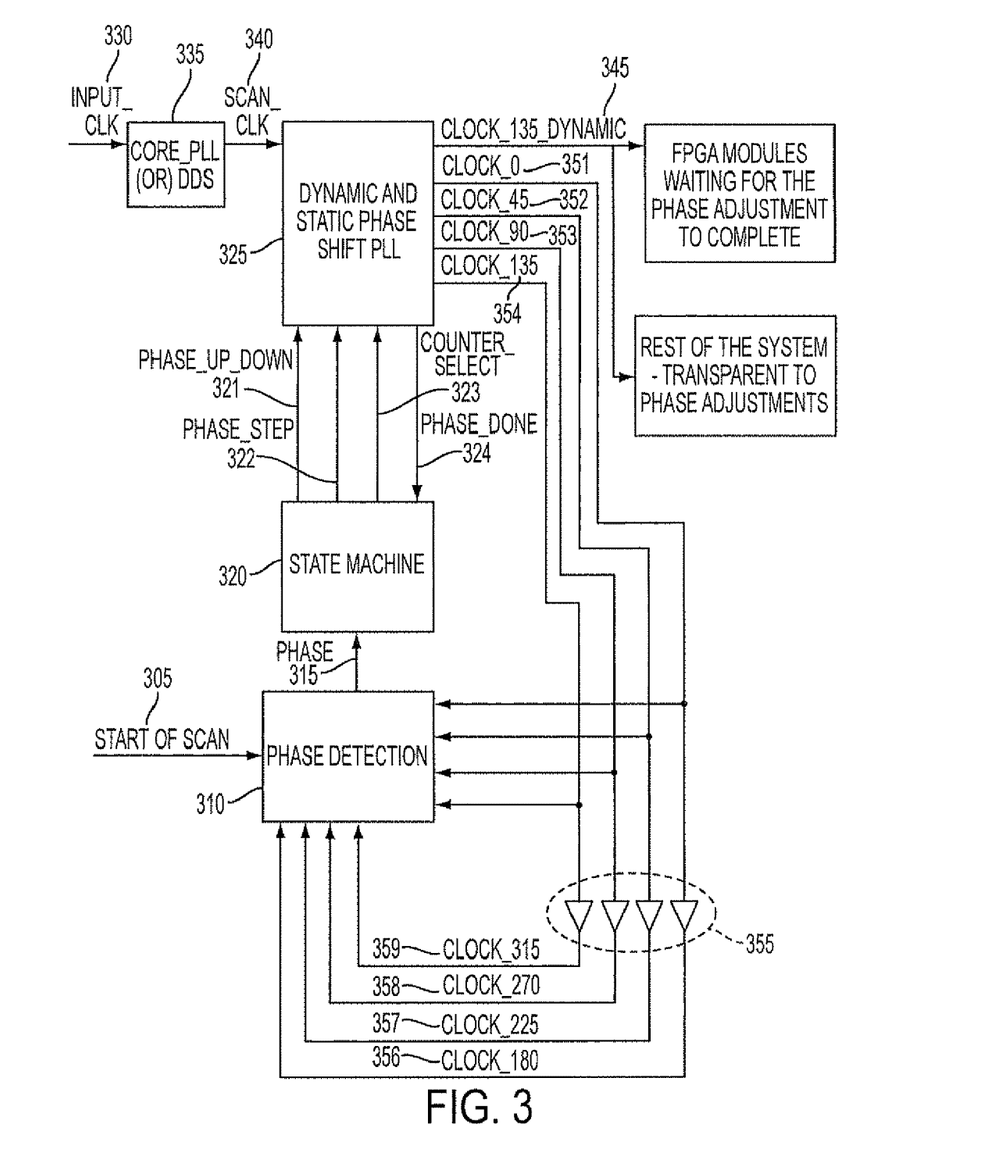
FIG. 3 illustrates an exemplary schematic for phase adjustment and clock sharing.

FIG. 3 is an exemplary schematic for phase adjustment and clock sharing. As explained above, the SOS detector 260 sends the SOS signal to the electronics and logic and control unit 210. The SOS signal is represented as the Start-of-Scan signal 305 in FIG. 3. As explained above, in step S105 of FIG. 1, the Start-of-Scan signal 305 is input to the phase detection unit 310 in order to figure out how to adjust the phase for the video clock. Although not limited to this embodiment, the phase detection unit 310 receives inputs for eight different clock signals, each offset by 45 degrees from 0 degrees to 315 degrees. The phase detection unit 310 can then determine which clock phase to adjust based upon the SOS signal. The phase detection unit 310 accomplishes this by comparing the SOS signal to the plurality of phase adjusted clock signals, and selecting the appropriate phase adjusted clock signal based upon the rising edge of the SOS signal, as explained above in steps S110 and S115 of FIG. 1.

Once the appropriate phase is decided by the phase detection unit 310, the phase 315 is output to a state machine 320 that instructs the dynamic and static phase shift phase lock loop 325 ("dynamic and static phase shift PLL 325") to alter the phase of the incoming clock signal. As explained in FIG. 1, steps S120 to S145 represent the communication process between the state machine 320 and the dynamic and static phase shift PLL 325. Although not limited to this embodiment, the state machine outputs three signals to instruct the dynamic and static phase shift PLL to adjust the phase, and receives one input signal as response from the dynamic and static phase shift PLL 325.

Phase_up/down signal 321 indicates the direction in which the phase should be shifted to the dynamic and static phase shift PLL 325. For example, a phase-up signal from the phase-up/down signal 321 indicates that the phase should be incremented in a numerically increasing direction based upon the determined increment in the phase_step signal 322. So for instance, although not limited to this embodiment, the phase_step signal 322 could be set at an increment of 45 degrees, and if the phase_up/down signal 321 indicates that the phase should be shifted up, the dynamic and static phase shift PLL will shift the signal up by an increment of 45 degrees (i.e. 180 to 225 degrees).

The counter_select signal 323 provides a count as to how many times the phase_up/down signal 321 must increment the phase. For example, if the phase is currently set to 135 degrees, but must be changed to 45 degrees, the state machine 320 will send a phase-down signal through the phase-up/down signal 321, with a phase increment of 45 degrees through the phase_step signal 322, with a count number of 2 through the counter_select signal 323. The dynamic and static phase shift PLL 325 will then decrease the phase by 45 degrees a total number of two times (two times corresponding to the counter_select signal 323). Once the phase has been reduced to 45 degrees, the dynamic and static phase shift PLL will indicate that the phase adjustment has been complete through the phase_done signal 324. It should be appreciated that the above-mentioned description of the state machine 320 communication with the dynamic and static phase shift PLL 325 is only an exemplary embodiment, and is therefore not limited to just this embodiment.

As can be seen in FIG. 3, an input_clk signal 330 is input as a clock signal for a field programmable gate array ("FPGA"). The input_clk signal 330 is input into a core_PLL/DDS 335 where the input elk signal 330 is adjusted based on the ability of a photoreceptor and adjusts the input_clk signal 330 to use more pixels in regions to provide more light where the photoreceptor may be deficient in a particular region, and use less pixels to provide less light to adjust for a photoreceptor that overcompensates in a certain region. The adjusted clock signal is output as scan elk signal 340 which is then input to the dynamic and static phase shift PLL as the video clock signal.

In one embodiment, the dynamic and static phase shift PLL 325 outputs four clock signals offset by a phase amount. For example, each clock signal can be offset by 45 degrees. In one embodiment, the dynamic and static phase shift PLL 325 outputs clock signals clock_0 351, clock_45 352, clock_90 353, and clock_135 354 as input to the phase detection unit 310. Though not limited to this embodiment, clock_0 351 correspond to a 0 degree phase clock signal, clock_45 352 corresponds to a 45 degree phase clock signal, clock_90 353 corresponds to a 90 degree phase clock signal, and clock_135 354 corresponds to a 135 degree phase clock signal. These respective clock signals also pass through clock signal inverters 355 where the respective clock signals are inverted to an inverted phase. Although not limited to this embodiment, the clock signals are inverted by 180 degree phase so clock_0 351 is inverted to clock_180 356 (having a phase of 180 degrees), clock_45 352 is inverted to clock 225 357 (having a phase of 225 degrees), clock_90 353 is inverted to clock_270 358 (having a phase of 270 degrees), and clock_135 354 is inverted to clock_315 359 (having a phase of 315 degrees). The respective inverted clock signals are also input into the phase detection unit 310.

Once the appropriate phase is adjusted by the dynamic and static phase shift PLL, the adjusted clock signal is output as the clock_135_dynamic 345 from the dynamic and static phase shift PLL 325. Though not limited to this embodiment, the clock_135_dynamic is originally set to 135 degrees because at 135 degrees, less steps would be required to adjust in either the up or down direction of phase. The clock_135_dynamic is the adjusted video clock signal that is now in synchronization with the SOS signal.

FIG. 4 illustrates an example of a phase detection timing diagram for detecting the Phase of the pixel clock signal. FIG. 4 shows the timing diagrams for the inputs of the phase detection unit 310 as shown in FIG. 3. SOS signal refers to the starting point of the start-of-scan signal. VCLK_0 through VCLK_315 represent the eight different phase clock signals that are offset by a phase increment. In the particular embodiment shown in FIG. 4, there are eight different phase clock signals that are offset by a phase of 45 degrees.

FIG. 4 shows how the SOS alignment clock is chosen. Although not limited to this embodiment, the same PLL is used to generate eight clocks with the same frequency as pixel_clk but with different phases. In an exemplary embodiment, clocks with phases 0, 45, 90, 135, 180, 225, 270, and 315 degrees are generated and used by the Phase Detection circuit to make a decision on the closest matching clock to the SOS signal. The Phase Detection Module generates a three-bit phase output which is input in the state machine 320 of FIG. 3. The phase detection takes into account the metastability state, as the input signal (SOS) is asynchronous to the system. In an exemplary embodiment, the phase detection module makes a decision with a maximum error of $\frac{1}{8}^{th}$ of the pixel clock. It should be appreciated that the maximum error is not limited to only $\frac{1}{8}^{th}$ of the pixel clock, but may be larger or smaller, as desired.

The SOS signal begins at a certain point along the phase determining direction. In an exemplary embodiment, the phase determining direction is the x-direction starting at 0 degrees, incrementing by 45 degrees in each interval, and going up to 315 degrees. The leading edge (i.e. the rising edge) of the SOS signal determines which clock phase to use. For example, if the SOS signal rises between the 180 degree and 225 degree interval, the system knows to use the VCLK_180 clock signal. Once the appropriate phase clock signal is selected, the value is submitted to the state machine 220 which then sends the appropriate communication signals to the dynamic and static phase shift PLL 325.

Figure 5:
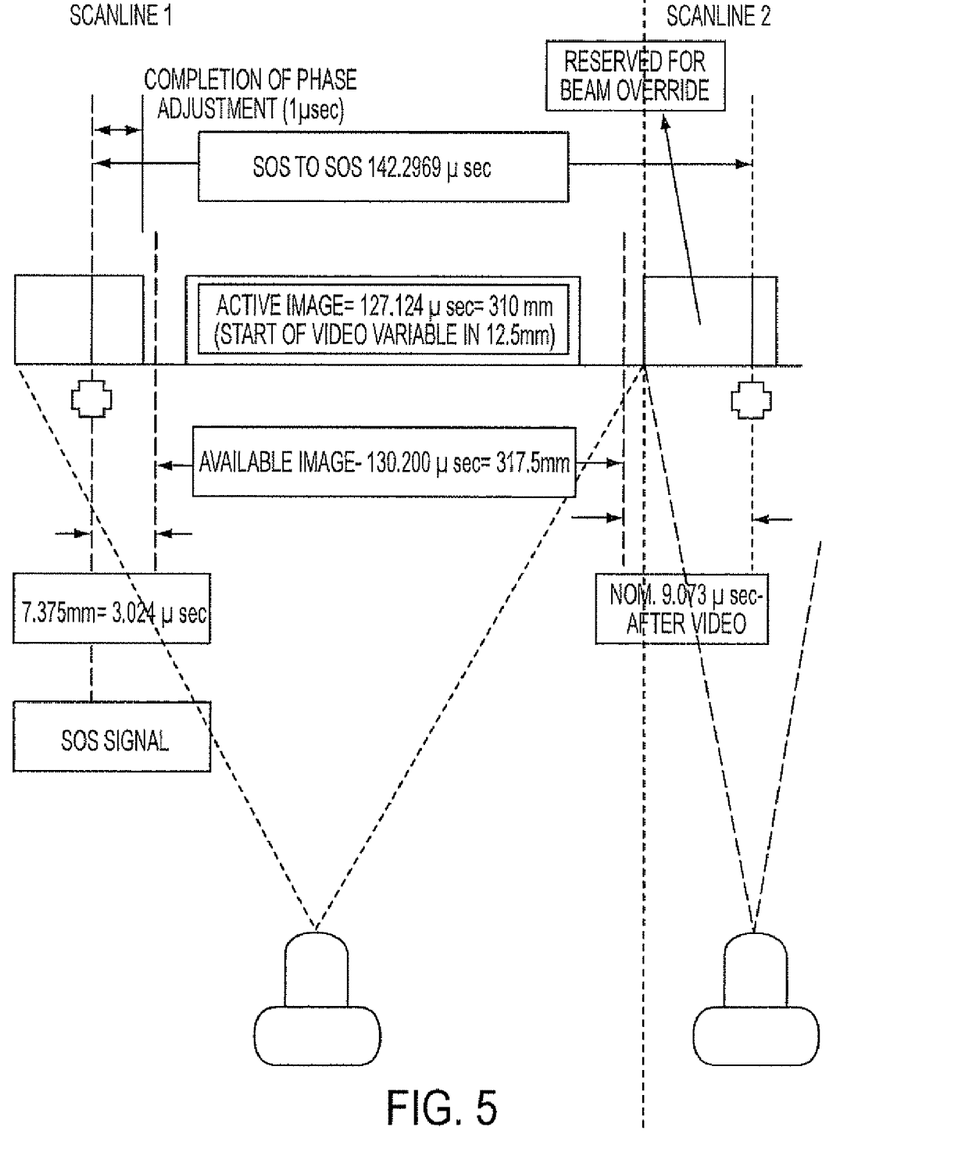
FIG. 5 illustrates a timing diagram in the fast scan direction for aligning the timing of the video pixel clock signal with the ROS start-of-scan sensor signal.

FIG. 5 illustrates a timing diagram in the fast scan direction for aligning the timing of the video pixel clock signal with the ROS start-of-scan sensor signal. Depending on the value of the phase output from the phase detection unit 310, the state machine 320 drives the control signals to the dynamic and static phase shift PLL 325. The dynamic and static phase shift PLL 325 dynamic clock output gradually changes the phase to align with the SOS signal. During this period, the dynamic and static phase shift PLL 325 does not lose clock as the phase reconfiguration is done by changing the counter start position or by choosing one of eight internally generated VCO clocks.

Phase shifting is done at a slow pace, which is equivalent to adding jitter of a few pico seconds to the clock.

As shown in FIG. 3, all modules in the system use the dynamic clock clock_135_dynamic 345. If the adjustment is not performed, there is a potential problem of clock domain crossing as the clocks driving the modules (phase dependent and phase independent) are out of phase. Phase changes are transparent to the modules which are phase independent.

The pixel_clk signal input can be driven from an external source like a direct digital synthesizer (DDS) as shown in FIG. 3. The proposed phase adjustment scheme takes approximately 1 microsecond to adjust the clock to the desired phase which is within the time frame from SOS to available image as can be seen in FIG. 5. In an exemplary embodiment, the proposed method is targeted for the Altera FPGAs, but can also be used for other FPGAs.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method for aligning a clock signal in an image forming device comprising the steps of:
   inputting a start-of-scan signal;
   inputting a plurality of candidate phase adjusted clock signals;
   separating the plurality of phase adjusted clock signals by a phase increment;
   determining a phase time in which the start-of-scan signal reaches a rising clock edge;
   selecting one of the plurality of phase adjusted clock signals as an adjusted clock phase signal;
   outputting the adjusted clock phase signal;
   receiving the adjusted clock phase signal as in input to a state machine; and
   receiving a plurality of inputs in a dynamic phase shift control logic from the output of the state machine, the state machine aligning the clock signal.

2. The method of claim 1, wherein
   the plurality of phase adjusted clock signals are set at intervals of 45 degrees apart from each other.

3. The method of claim 1, wherein
   the plurality of phase signals consist of eight signals each set at intervals of 45 degrees apart from each other.

4. The method of claim 1, wherein
   the plurality of inputs from the state machine indicate a direction to adjust the phase, a numerical increment in which the phase should be adjusted, and a count for the number of times the phase should be adjusted in a particular direction.

5. The method of claim 1, wherein
   the dynamic phase shift control logic outputs a phase done signal to the state machine indicating that the phase for the clock signal has been completely adjusted.

6. An apparatus for aligning a clock signal in an image forming device comprising:
   a phase detection unit that receives as an input a start-of-scan signal and a plurality of candidate phase adjusted clock signals, and outputs an adjusted clock phase signal,
   wherein the plurality of phase adjusted clock signals are separated by a phase increment,
   wherein the phase detection unit determines a phase time in which the start-of-scan signal reaches a rising clock edge,
   wherein the phase detection unit then selecting one of the plurality of phase adjusted clock signals as an adjusted clock phase signal; and
   wherein a state machine receives the adjusted clock phase signal from the phase detection unit;
   wherein a dynamic phase shift control logic receives a plurality of inputs from the state machine, the state machine aligning the clock signal.

7. The apparatus of claim 6, wherein
   the plurality of phase adjusted clock signals are set at intervals of 45 degrees apart from each other.

8. The apparatus of claim 6, wherein
   the plurality of phase signals consist of eight signals each set at intervals of 45 degrees apart from each other.

9. The apparatus of claim 6, wherein
   the plurality of inputs from the state machine indicate a direction to adjust the phase, a numerical increment in which the phase should be adjusted, and a count for the number of times the phase should be adjusted in a particular direction.

10. The apparatus of claim 6, wherein
    the dynamic phase shift control logic outputs a phase done signal to the state machine indicating that the phase for the clock signal has been completely adjusted.

11. An image forming apparatus comprising:
    a laser input device for directing formation of an image onto a medium, the laser input device generating a laser input signal having a clock phase signal, the clock phase signal having an initial phase;
    a rotatable motor having a plurality of mirrors on each face of the motor for reflecting the laser input signal;
    a start-of-scan detector for receiving the reflected laser light from one of the plurality of mirrors on the rotatable motor, the start-of-scan detector outputting a start-of-scan signal;
    a phase adjustment unit for adjusting the clock phase of the laser input signal, the phase adjustment unit having a phase detection unit that receives as an input the start-of-scan signal and a plurality of candidate phase adjusted clock signals, and outputs an adjusted clock phase signal; and
    a photoreceptive drum that receives the laser input signal and forms an image onto a medium,
    wherein the plurality of phase adjusted clock signals are separated by a phase increment,
    wherein the phase detection unit determines a phase time in which the start-of-scan signal reaches a rising clock edge,
    wherein the phase detection unit then selects one of the plurality of phase adjusted clock signals as an adjusted clock phase signal;
    wherein a state machine in the phase adjustment unit receives the adjusted clock phase signal from the phase detection unit; and
    wherein a dynamic phase shift control logic receives a plurality of inputs from the state machine, the state machine aligning the clock signal.

12. The image forming apparatus of claim 11, wherein
    the plurality of phase adjusted clock signals are set at intervals of 45 degrees apart from each other.

13. The image forming apparatus of claim 11, wherein
    the plurality of phase signals consist of eight signals each set at intervals of 45 degrees apart from each other.

14. The image forming apparatus of claim 11, wherein the plurality of inputs from the state machine indicate a direction to adjust the phase, a numerical increment in which the phase should be adjusted, and a count for the number of times the phase should be adjusted in a particular direction.

15. The image forming apparatus of claim 11, wherein the dynamic phase shift control logic outputs a phase done signal to the state machine indicating that the phase for the clock signal has been completely adjusted.

16. The method of claim 15, wherein the plurality of phase adjusted clock signals are set at intervals of 45 degrees apart from each other.

17. The method of claim 15, wherein the plurality of phase signals consist of eight signals equally spaced apart in phase.

18. A method for aligning a clock signal in an image forming device comprising the steps of:

inputting a start-of-scan signal;
inputting a plurality of candidate phase adjusted clock signals;
separating the plurality of phase adjusted clock signals by a phase increment;
determining a phase time in which the start-of-scan signal reaches a rising clock edge;
selecting one of the plurality of phase adjusted clock signals as an adjusted clock phase signal; and
outputting the adjusted clock phase signal;
utilizing the adjusted clock phase signal to generate a phase direction signal, a phase increment signal and an increment count signal;
utilizing the phase direction signal, the phase increment signal and the increment count signal to align a phase of the clock signal.

* * * * *